(12) United States Patent
Lin et al.

(10) Patent No.: US 9,107,153 B1
(45) Date of Patent: Aug. 11, 2015

(54) PARALLEL PROCESSING OF BOTH CODE SYNCHRONIZATION AND FREQUENCY SYNCHRONIZATION FOR WIRELESS COMMUNICATION

(71) Applicant: Marvell International Ltd., Hamilton (BM)

(72) Inventors: Ming Lin, Cupertino, CA (US); Songping Wu, Cupertino, CA (US); Quan Zhou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 196 days.

(21) Appl. No.: 13/776,538

(22) Filed: Feb. 25, 2013

Related U.S. Application Data

(60) Provisional application No. 61/602,998, filed on Feb. 24, 2012.

(51) Int. Cl.
*H04J 3/06* (2006.01)
*H04W 56/00* (2009.01)
*H04B 7/26* (2006.01)

(52) U.S. Cl.
CPC ............ *H04W 56/00* (2013.01); *H04B 7/2643* (2013.01); *H04B 2201/7073* (2013.01)

(58) Field of Classification Search
None
See application file for complete search history.

(56) References Cited

U.S. PATENT DOCUMENTS

| | | | |
|---|---|---|---|
| 6,868,111 B1* | 3/2005 | Oleynik | 375/145 |
| 8,331,419 B2 | 12/2012 | Zhang et al. | |
| 2005/0008040 A1* | 1/2005 | Becker et al. | 370/503 |
| 2006/0193305 A1* | 8/2006 | Litwin et al. | 370/350 |
| 2007/0013583 A1* | 1/2007 | Wang et al. | 342/357.15 |
| 2007/0047671 A1* | 3/2007 | Chen | 375/326 |
| 2008/0175189 A1* | 7/2008 | Furrer et al. | 370/328 |
| 2008/0186948 A1* | 8/2008 | Ramaswamy et al. | 370/350 |
| 2009/0086713 A1* | 4/2009 | Luo | 370/350 |
| 2010/0142506 A1* | 6/2010 | Chu et al. | 370/342 |
| 2010/0158164 A1* | 6/2010 | Oh et al. | 375/343 |
| 2010/0158165 A1 | 6/2010 | Myong | |
| 2010/0266062 A1* | 10/2010 | Mussmann et al. | 375/267 |
| 2010/0271263 A1* | 10/2010 | Moshfeghi | 342/378 |
| 2011/0007854 A1* | 1/2011 | Li | 375/344 |
| 2011/0274102 A1* | 11/2011 | Kim et al. | 370/350 |
| 2011/0314321 A1* | 12/2011 | Chard et al. | 713/375 |
| 2012/0314788 A1* | 12/2012 | Shi et al. | 375/260 |

(Continued)

OTHER PUBLICATIONS

IEEE Std 802.15.4-2011; "IEEE Standard for Local and metropolitan area networks—Part 15.4: Low-Rate Wireless Personal Area Networks (LR-WPANs)"; The Institute of Electrical and Electronics Engineers, Inc.; Jun. 16, 2011; 334 pages.

(Continued)

*Primary Examiner* — Ian N Moore
*Assistant Examiner* — Phong La

(57) ABSTRACT

Systems and techniques relating to wireless communications are described. A described technique includes receiving a signal via a wireless channel, performing code synchronization by at least using a peak counter to count peak correlations based on the signal and a known preamble, performing frequency synchronization based on the signal, and using, based on a successful completion of the code synchronization, at least a result of the frequency synchronization to demodulate data from the signal. The technique includes starting the frequency synchronization during the code synchronization when an output value of the peak counter satisfies a predetermined criterion.

18 Claims, 6 Drawing Sheets

(56) References Cited

U.S. PATENT DOCUMENTS

2013/0143595 A1* 6/2013 Moshfeghi ............. 455/456.1
2013/0148767 A1* 6/2013 Dubey et al. ............. 375/346
2013/0184002 A1* 7/2013 Moshfeghi ............. 455/456.1

OTHER PUBLICATIONS

ZigBee Standards Organization; "ZigBee Specification"; ZigBee Alliance, Inc.; Jan. 17, 2008; 604 pages.

* cited by examiner

PARALLEL PROCESSING OF BOTH CODE SYNCHRONIZATION AND FREQUENCY SYNCHRONIZATION FOR WIRELESS COMMUNICATION

CROSS REFERENCE TO RELATED APPLICATION

This disclosure claims the benefit of the priority of U.S. Provisional Application Ser. No. 61/602,998, filed Feb. 24, 2012, which is incorporated herein by reference in its entirety.

BACKGROUND

This disclosure relates to synchronization techniques for wireless communications.

Wireless communication systems can use one or more synchronization techniques for transmitting and receiving signals. In some systems, a preamble is included in a portion of a data packet such that a receiving device can use the preamble to perform synchronization. A preamble can include one or more preamble symbols arranged in a sequence that is known at both transmitting and receiving devices.

Various examples of wireless communication devices include mobile phones, smart phones, wireless routers, wireless hubs, base stations, and access points. Moreover, additional examples of devices include wireless sensors, wireless actuators, and wireless control panels. In some cases, wireless communication electronics are integrated with data processing equipment such as laptops, personal digital assistants, and computers. Wireless communication devices can use one or more wireless communication technologies, such as Code Division Multiple Access (CDMA), direct-sequence spread spectrum (DSSS), or orthogonal frequency division multiplexing (OFDM), to communicate.

SUMMARY

The present disclosure includes systems and techniques related to synchronization for wireless communications. According to an aspect of the described systems and techniques, a method for wireless communications includes receiving a signal via a wireless channel, performing code synchronization by at least using a peak counter to count peak correlations based on the signal and a known preamble, performing frequency synchronization based on the signal, and using, based on a successful completion of the code synchronization, at least a result of the frequency synchronization to demodulate data from the signal. The method includes starting the frequency synchronization during the code synchronization when an output value of the peak counter satisfies a predetermined criterion.

These and other implementations can include one or more of the following features. Performing the code synchronization can include producing approximate sample timing information at a first time period; and producing revised sample timing information at a later, second time period. Performing the frequency synchronization can include using a down sampled version of the signal that is based on the approximate sample timing information. Implementations can include detecting a reset event; and performing a reset of the code synchronization and the frequency synchronization in response to the event. Performing the frequency synchronization can include performing coarse frequency acquisition; and performing fine frequency acquisition. Starting the frequency synchronization can include starting a coarse frequency acquisition when an output value of the peak counter satisfies a criterion based on a first predetermined peak count value; and starting a fine frequency acquisition when an output value of the peak counter satisfies a criterion based on a second predetermined peak count value. Implementations can include detecting an event that resets the peak counter; performing a reset of the code synchronization in response to the event; and performing a reset of the coarse frequency acquisition and the fine frequency acquisition in response to the event.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

A system for wireless communications can include a signal interface configured to receive a signal; and circuitry configured to perform operations. The operations can include performing code synchronization by at least using a peak counter to count peak correlations based on (i) the signal and (ii) a known preamble; performing frequency synchronization based on the signal, where performing frequency synchronization includes starting the frequency synchronization during the code synchronization when an output value of the peak counter satisfies a predetermined criterion; and using, based on a successful completion of the code synchronization, at least a result of the frequency synchronization to demodulate data from the signal.

A wireless communication device can include circuitry configured to receive a signal via a wireless channel, a peak counter configured to count peak correlations based on the signal and a known preamble, a code synchronizer configured to perform code synchronization based on an output of the peak counter, a frequency synchronizer configured to perform frequency synchronization based on the signal, where the frequency synchronization is started during the code synchronization when an output value of the peak counter satisfies a predetermined criterion, and a demodulator configured to use, based on a successful completion of the code synchronization, at least a result of the frequency synchronization to demodulate data from the signal.

Potential advantages of parallel processing of code synchronization and frequency synchronization can include reduced synchronization time, reduced hardware complexity, enhanced signal processing performance, or a combination thereof. For example, parallel processing can allow more processing time for both code synchronization and frequency synchronization processes to increase signal processing performance without increasing overall synchronization processing time. Further, parallel processing can increase receiver sensitivity performance by allowing both processes—code synchronization and frequency synchronization—to use up to all of the symbols within a preamble of a packet. Parallel processing can reduce hardware costs by reducing buffer memory requirements.

Details of one or more implementations are set forth in the accompanying drawings and the description below. Other features and advantages can be apparent from the description and drawings, and from the claims.

DRAWING DESCRIPTIONS

DETAILED DESCRIPTION

Figure 1:
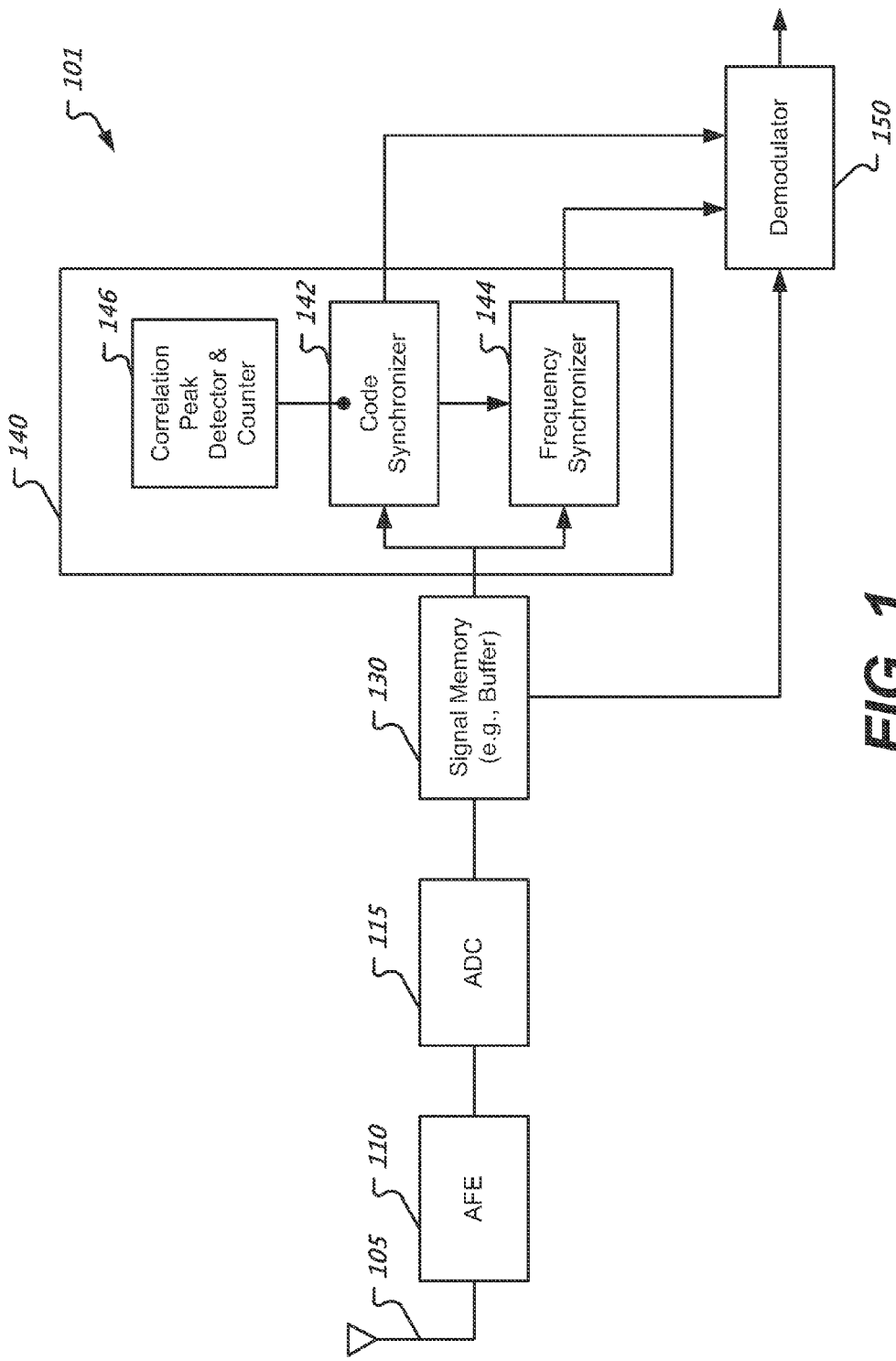
FIG. 1 shows a simplified receive chain architecture for an example of a wireless communication device configured for parallel processing of code synchronization and frequency synchronization.

In today's wireless systems, a synchronization process is a critical aspect of a receive (RX) chain in a wireless communication device. A high quality synchronization process can guarantee accurate data demodulation and, therefore, guarantee reliable communications between a transmitting device and a receiving device. Synchronization can include code synchronization and frequency synchronization. Code synchronization, also commonly referred to as timing synchronization, acquires the sample timing of an incoming packet. Code synchronization can include packet detection, timing acquisition, and a technique for preventing false triggers caused by a noise or an interference signal. Frequency synchronization acquires and compensates for a frequency offset caused by a wireless channel and hardware within the transmitting device and the receiving device.

In many communication protocols, packets include a preamble designated for the synchronization process. A preamble can include one or more symbols arranged in a sequence, where the protocol specifies what the preamble must be. Increasing the quality of code synchronization may require increasing the length of the preamble (if it is an option), increasing processing time, or both. Code synchronization can use the preamble to provide timing information for a received signal. Circuitry at the forefront of a RX baseband chain of a device is typically configured to perform code synchronization. Code synchronization can use a peak detection technique that correlates an incoming signal with a known pattern, e.g., a pattern corresponding to a preamble of a packet, and searches for a maximum point of correlation to determine a code boundary, such as a start of a field within a packet.

Code synchronization can include buffering and averaging incoming signals in order to increase signal quality. However, this may increase the process time for code synchronization by increasing the number of preambles needed for successful code synchronization. To differentiate a data packet from a random noise pattern and/or interference signal, a device can search for an additional number of preamble symbols to confirm reception of a packet. Searching for additional preamble symbols may increase the processing time of a code synchronization process.

Frequency synchronization can be as important as code synchronization since frequency information often encodes communication data, at least in part. A frequency synchronization process can use frequency offset information derived from a received signal, including the portions that correspond to a preamble of a packet. Further, a frequency synchronization process can use information produced by a code synchronization process. For example, a frequency synchronization process can use symbol timing information produced by the code synchronization to down sample an incoming signal. In some implementations, a packet is differentially encoded, and the process can perform a differential computation to calculate a linear frequency offset term associated with the differentially encoded packet. Such a process can require multiple iterations to improve acquisition accuracy at low signal-to-noise ratio (SNR), which adds to the overall duration of frequency synchronization. Moreover, the process may require signal averaging to improve signal quality and thus may require additional time.

Unlike conventional systems where frequency synchronization is performed after code synchronization, this disclosure provides details and examples of technologies for parallel processing of code synchronization and frequency synchronization. A described device performs code synchronization and frequency synchronization in parallel. Rather than waiting for finalized sample timing information, frequency synchronization starts early on during code synchronization using approximate sample timing information. Potential advantages of parallel processing of code and frequency synchronization can include reducing the process time of the overall synchronization process, providing more preamble resources to both code and frequency synchronization processes individually to enhance the performance of each individual process, or a combination thereof. However, instead of reducing the process time of the overall synchronization process, a better code synchronization algorithm that requires additional time can be used since the additional time can be compensated for by the parallel processing technique. Parallel processing, for example, can allow more processing time for both code synchronization and frequency synchronization to increase signal processing performance without increasing overall synchronization processing time. Increasing signal processing performance can include increasing a sensitivity of a receiver, e.g., the receiver's handling in a low SNR environment.

The amount of symbols within a preamble of a packet is determined by the protocol used to generate the packet. Some protocols use a longer preamble to compensate for low-power designs were transmission signals are easily covered by noise. Designing for a low SNR environment, a synchronization process may require additional processing time and additional buffer space in order to compensate for the low SNR.

Thus, a longer preamble may cause a receiving device to use a larger buffer to store signal samples. However, a device can potentially use a smaller buffer based on acquiring approximate sample timing earlier such that down sampling of data stored within the buffer can start earlier. Some design tradeoffs include (i) accurate sample timing acquisition versus amount of process time and preambles consumed, and (ii) accurate offset frequency acquisition versus amount of process time consumed. Performance impacts caused by additional time required for handling a low SNR environment can be mitigated or eliminated by starting frequency synchronization early on in the code synchronization process through one or more techniques disclosed herein.

FIG. 1 shows a simplified receive chain architecture for an example of a wireless communication device 101 configured for parallel processing of code synchronization and frequency synchronization. The device 101 includes one or more antennas 105, analog front end (AFE) 110, analog-to-digital converter (ADC) 115, signal memory 130, a synchronizer 140, and a demodulator 150. The signal memory 130 can include a buffer. The synchronizer 140 includes a code synchronizer 142 and a frequency synchronizer 144 that are configured to operate in parallel. The code synchronizer 142 is configured to provide approximate sample timing information to the frequency synchronizer 144 to allow frequency synchronization to start while code synchronization is in progress. The demodulator 150 uses the synchronization information provided by the code synchronizer 142 and the frequency synchronizer 144 to demodulate an input signal.

The code synchronizer 142 can include correlation peak detector and counter circuitry 146 that detects and counts peaks caused by matching a portion of a received signal with a known preamble. During code synchronization, sample timing associated with one or more peaks found early on in the code synchronization process can be used as an approximate sample timing for frequency synchronization. The code synchronizer 142 provides an approximate sample timing to the frequency synchronizer 144 such that the frequency synchronization process can start substantiality before the code synchronization process finishes, e.g., after detecting a single peak. Based on a potential for unsuccessful code synchronization, the code synchronizer 142 can reset itself and the frequency synchronizer 144 in response to detecting a reset event such as a false lock on a packet's preamble or a complete signal fade. Other types of reset events are possible.

Figure 2:
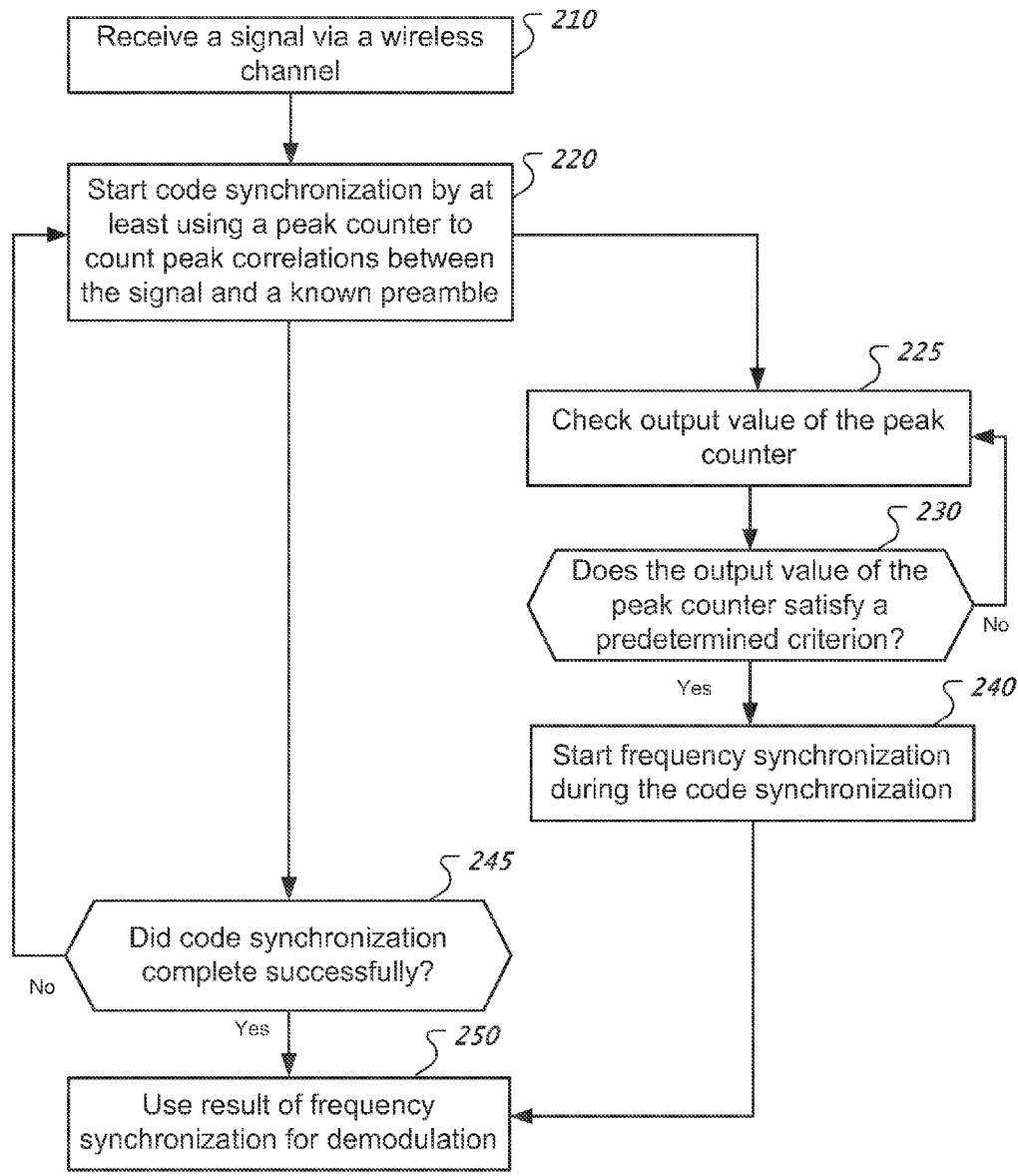
FIG. 2 shows a flowchart for an example of a process including parallel processing of code synchronization and frequency synchronization that executes on a receiving wireless communication device.

FIG. 2 shows a flowchart for an example of a process including parallel processing of code synchronization and frequency synchronization that executes on a receiving wireless communication device. At 210, the process receives a signal via a wireless channel. Receiving a signal can include performing signal filtering, gain control, analog-to-digital conversion, or a combination thereof. At 220, the process starts code synchronization by at least using a peak counter to count peak correlations based on the signal and a known preamble. Code synchronization can include correlating a portion of the received signal with a known sequence such as a known preamble sequence to determine a peak. A peak will occur when at least a portion of the known sequence overlaps with a corresponding sequence within the received signal. When no signal is present or when the SNR is poor, no peak or small peaks may occur. One technique for measuring peaks includes generating a peak-to-average measure of a correlation signal. Other techniques are possible. Code synchronization can include outputting a starting index of a field within a data packet such as a preamble, delimiter, header, or payload.

At 225, the process checks an output value of the peak counter. At 230, the process determines whether the output value of the peak counter satisfies a predetermined criterion. If the peak counter satisfies the predetermined criterion, the process, at 240, starts frequency synchronization during the code synchronization. If the peak counter does not satisfy the predetermined criterion, the process will continue to recheck the output value of the peak counter at 225. A predetermined criterion can specify a minimum number of peaks required in order to start frequency synchronization. In some implementations, each symbol in a preamble may potentially produce a peak and hence increment the peak counter. Based on counting to a predetermined amount of peaks that is less than an entire preamble sequence, it can be deemed that enough timing information has been collected to provide approximate timing information for frequency synchronization. However, if code synchronization later determines that it misidentified a peak, or for other reasons such as a complete signal fade, it may reset the peak counter and reset code and frequency synchronization. Thus, at 245, the process determines whether code synchronization completed successfully. If so, the process, at 250, uses a result of frequency synchronization for demodulation. The process can also use a result of code synchronization for demodulation. If code synchronization did not complete successfully, code synchronization can be restarted at 220 using the same or different portion of the signal, and accordingly, frequency synchronization can be later restarted at 240.

Performing code synchronization at 220 can include producing approximate sample timing information at a first time period, and producing revised sample timing information at a later, second time period. Frequency synchronization at 240 can include using a down sampled version of a signal that is based on the approximate sample timing information. In some implementations, frequency synchronization at 240 includes performing coarse frequency acquisition and performing fine frequency acquisition. Performing coarse frequency acquisition and fine frequency acquisition can overlap in time. The process can start the coarse frequency acquisition when an output value of the peak counter satisfies a criterion based on a first predetermined peak count value. The process can start the fine frequency acquisition when an output value of the peak counter satisfies a criterion based on a second predetermined peak count value. In some implementations, the second predetermined peak count value is greater than the first predetermined peak count value. The process can also include detecting an event that resets the peak counter, and performing a reset of the coarse frequency acquisition and the fine frequency acquisition based on a detection of the event.

In some implementations, code synchronization can include buffering and averaging incoming signal components to increase signal quality. Code synchronization can include counting a larger amount of peaks in order to prevent a false trigger as a received signal may be covered entirely by noise. Frequency synchronization can include averaging fine and coarse frequency acquisition results to increase signal quality. Fine and coarse frequency acquisition can require multiple iterations to iteratively improve a frequency offset estimation.

In some implementations, the frequency synchronization process can utilize a buffer for performing computations such as a differential computation based on information derived from a received signal. The signal buffer stores digitized samples of a portion of the received signal. In order to reduce the size of the buffer, sample timing needs to be acquired to down sample the signal.

Figure 3:
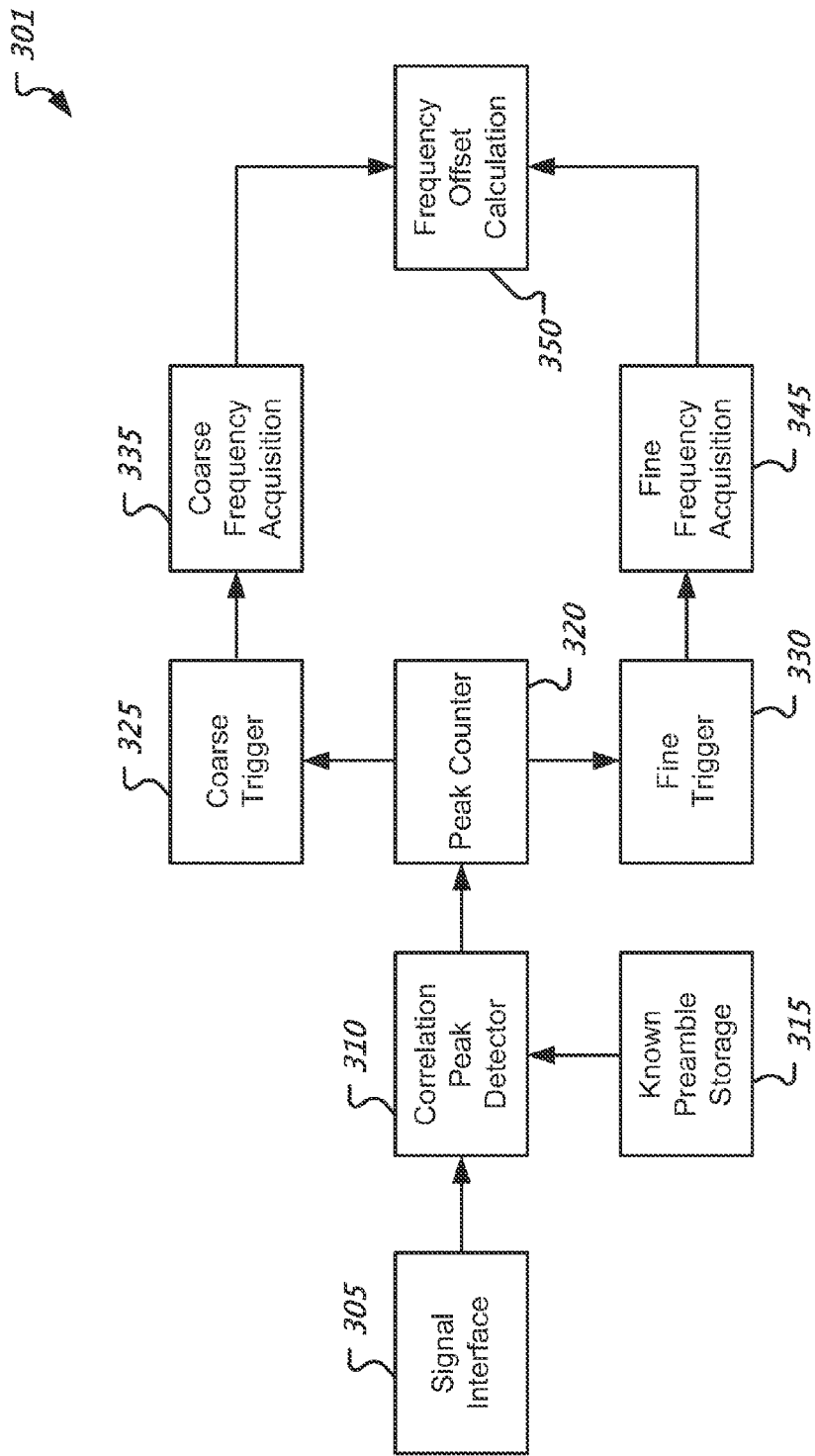
FIG. 3 shows a diagram for an example of a triggering architecture for parallel processing of code synchronization and frequency synchronization, where frequency synchronization includes a coarse acquisition and a fine acquisition.

FIG. 3 shows a diagram for an example of a triggering architecture 301 for parallel processing of code and frequency synchronization, where frequency synchronization includes coarse and fine acquisitions. The coarse and fine acquisitions are triggered at different times within the frequency synchronization process. A signal interface 305 provides an input signal to a correlation peak detector 310. The signal interface 305 can be communicatively coupled with an output of an ADC. In some implementations, the signal interface 305 provides access to a memory such as a signal sample buffer. The correlation peak detector 310 compares the input signal to a known preamble that is stored in a known preamble storage 315. In some implementations, the known preamble storage 315 is in a memory structure such as a random access memory structure. In some implementations, the known preamble storage 315 is a hardwired array of values in specialized logic. In some implementations, the known preamble is stored in a buffer within the correlation peak detector 310. The detector 310 can output a signal that indicates the peak of correlation between at least a portion of the known preamble and at least a portion of the input signal. A peak counter 320 can count the peaks from the detector 310.

Triggers such as a coarse trigger 325 and fine trigger 330 can read an output value from the peak counter 320 and determine whether a predetermined criterion has been satisfied. Based on a coarse trigger criterion, the coarse trigger 325 can cause a coarse frequency acquisition 335 to start. For example, the coarse trigger criterion can specify a predetermined number of peaks (e.g., two or three) that the peak counter 320 has to reach before starting the coarse frequency acquisition 335. Based on a fine trigger criterion, the fine trigger 330 can cause a fine frequency acquisition 345 to start. The fine trigger criterion can specify a predetermined number of peaks (e.g., seven or eight) that the peak counter 320 has to reach before starting the fine frequency acquisition 345. In some implementations, the fine trigger criterion is greater than the coarse trigger criterion in terms of the number of peaks. A frequency offset calculation is performed at 350 based on the outputs of the coarse frequency acquisition 335 and the fine frequency acquisition 345. In some implementations, the peak counter 320 counts up. In some other implementations, the peak counter 320 counts down from a predetermined value such as a maximum number of expected peaks.

Figure 4:
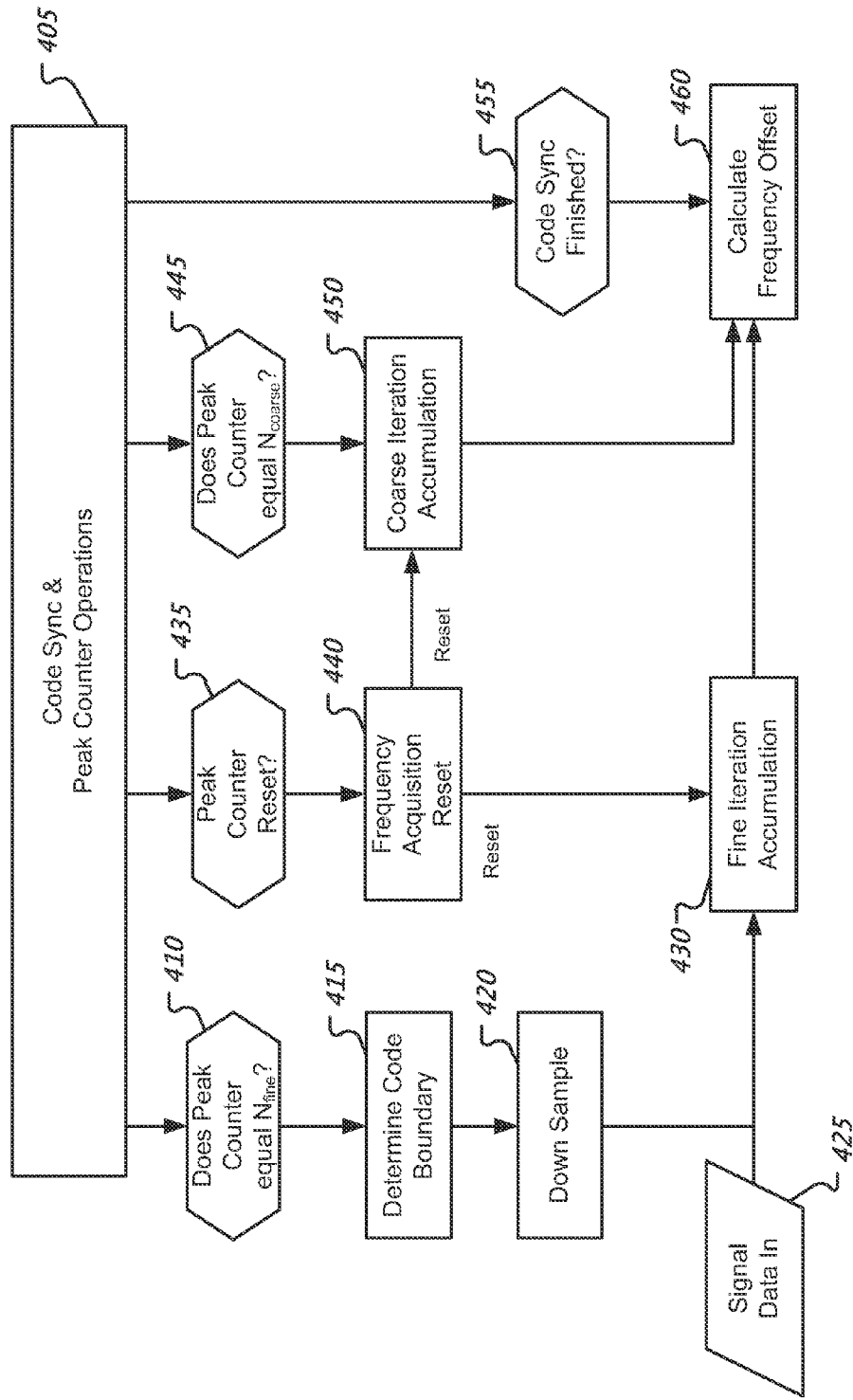
FIG. 4 shows a flowchart for an example of a process including parallel processing of code synchronization and frequency synchronization, where frequency synchronization includes a coarse acquisition and a fine acquisition.

FIG. 4 shows a flowchart for an example of a process including parallel processing of code and frequency synchronization, where frequency synchronization includes coarse and fine acquisitions. At 405, the process includes code synchronization and peak counter operations. The output of the peak counter is provided to multiple trigger mechanisms such as the fine trigger 410 and the coarse trigger 445. Once a trigger mechanism 410, 445 determines that its criterion has been satisfied by the current peak counter value, trigger mechanism 410, 445 launches a corresponding action. In some implementations, the trigger mechanisms 410, 445 and their associated actions operate in parallel.

At the fine trigger mechanism 410, the process determines whether the peak counter equals $N_{fine}$. If equal, the process determines a code boundary at 415. Determining a code boundary can include determining a start of a field within a data packet. At 420, the process down samples the signal data 425 using the determined code boundary. In some implementations, a memory stores the signal data 425. At 430, the process performs fine iteration accumulation based on the down sampled signal data 425. Fine iteration accumulation can include performing multiple iterations to successively determine a fine frequency offset estimation by accumulating additional frequency offset information from a received signal.

At the coarse trigger mechanism 445, the process determines whether the peak counter equals $N_{coarse}$. If equal, the process performs coarse iteration accumulation at 450. Coarse iteration accumulation can include performing multiple iterations to successively determine a coarse frequency offset estimation. In some implementations, a coarse frequency acquisition comes with a larger range but rougher resolution, whereas a fine frequency acquisition comes with a smaller range but finer resolution. In some implementations, the phase of peaks can be used for coarse estimation and accumulation.

The code synchronization process 405 can generate a reset event for reasons such as a misidentified peak, complete signal fade, or for other reasons. At 435, the process determines whether the peak counter was reset by the code synchronization process 405. If reset, the process issues a frequency acquisition reset command 440 to the fine iteration accumulation 430 and to the coarse iteration accumulation 450. Based on a reset event, the peak counter is reset to zero, and the trigger mechanisms 410, 445 are reactivated to monitor the peak counter.

At 455, the process determines whether the code synchronization has finished. If finished, the process, at 460, calculates a frequency offset using outputs from the fine iteration accumulation 430 and the coarse iteration accumulation 450. Calculating a frequency offset can include combining a fine frequency offset estimation and a coarse frequency offset estimation. Such combining can include adding the fine frequency offset estimation and the coarse frequency offset estimation together. Other types of combining are possible. In some implementations, an early combined frequency offset estimation can be computed before the end of code synchronization. Based on the successful completion of code synchronization, the early combined frequency offset estimation can be deemed as the final frequency offset value.

Figure 5:
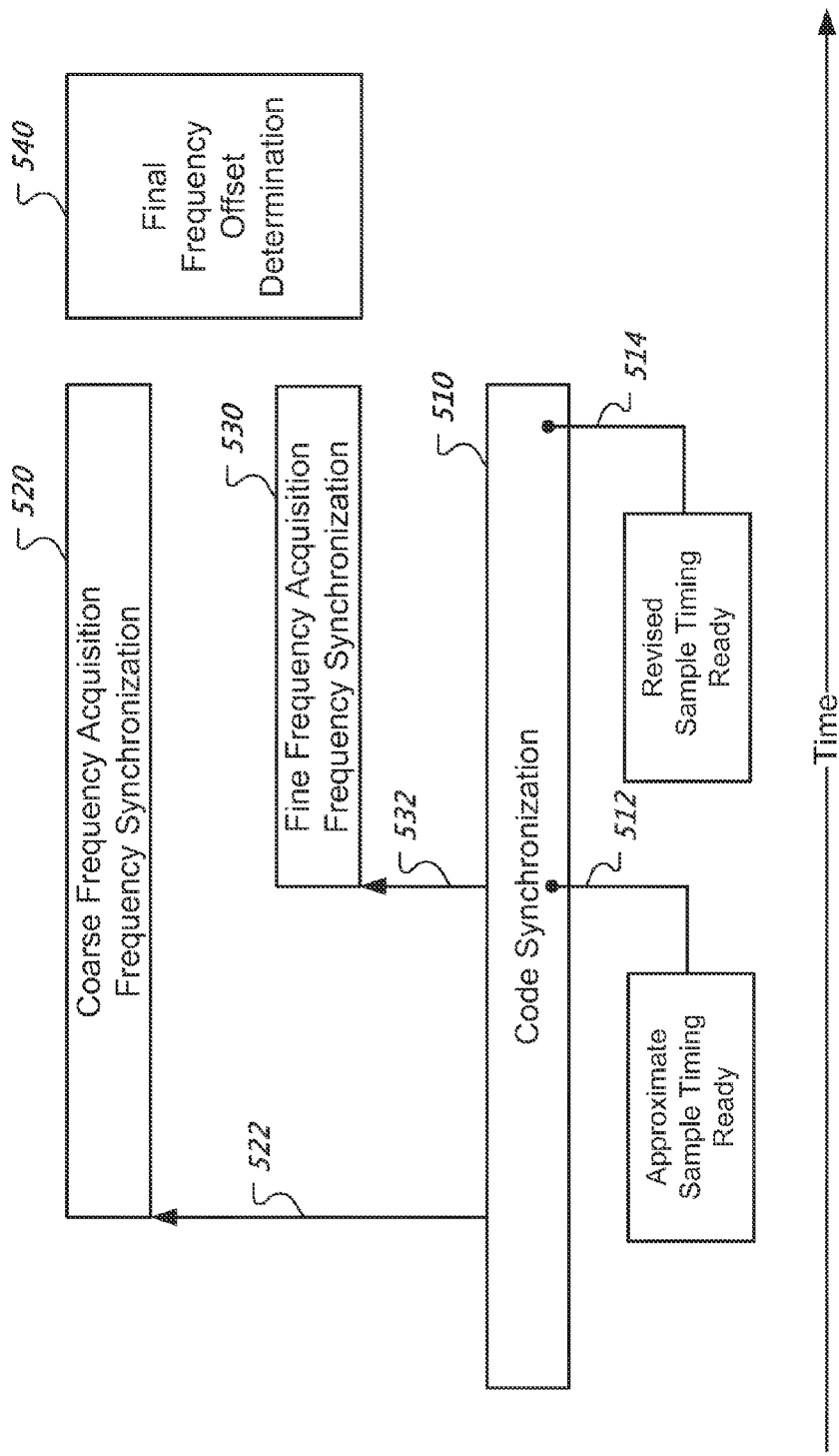
FIG. 5 shows a timing diagram for an example of a parallel processing of code synchronization and frequency synchronization.

FIG. 5 shows a timing diagram for an example of a paralleling process of code and frequency synchronization. The timing relations depicted in FIG. 5 are examples, other timing relationships are possible. Code synchronization 510, in this example, produces approximate sample timing information at time 512 and later produces revised sample timing information at time 514. Frequency synchronization includes coarse frequency acquisition 520 and fine frequency acquisition 530. The start 522 of the coarse frequency acquisition 520 can correspond to a peak counter reaching a first value, and the start 532 of the fine frequency acquisition 530 can correspond to the peak counter reaching a second value. The start 532 of the fine frequency acquisition 530 can correspond to the approximate sample timing information being ready at time 512. Based on the completion of frequency synchronizations 520, 530 and code synchronization 510, final frequency offset determination 540 can commence. In some implementations, the determination 540 can start earlier but is finalized based on the successful completion of the frequency synchronizations 520, 530 and code synchronization 510.

Figure 6:
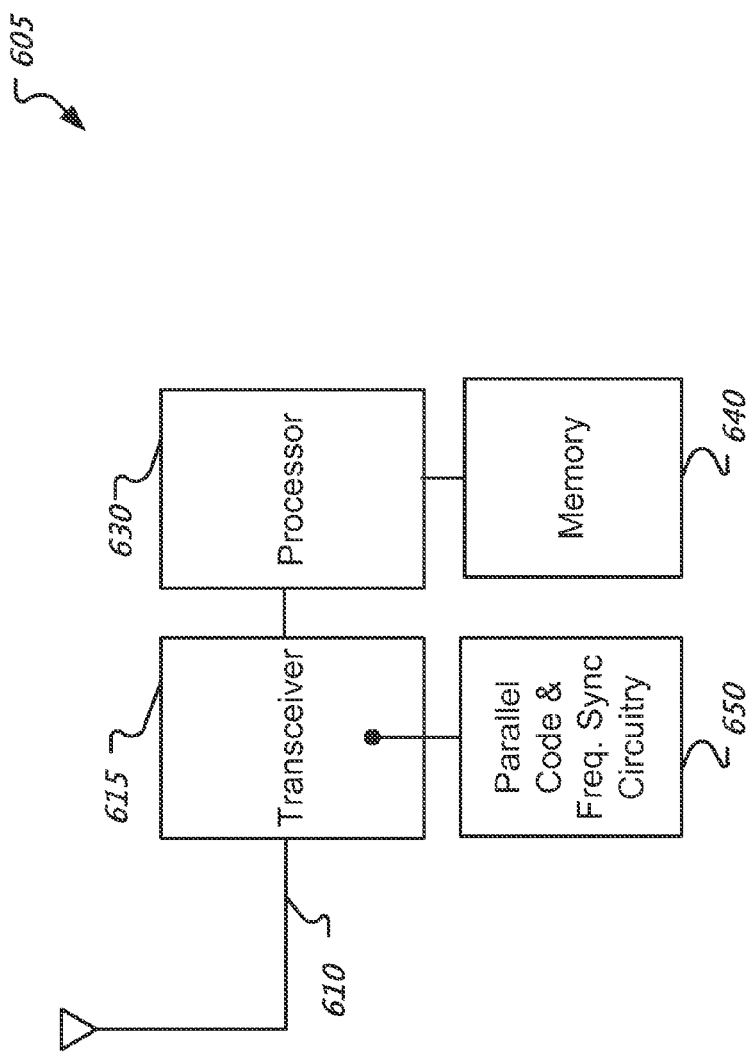
FIG. 6 shows a simplified architecture for an example of a wireless communication device.

FIG. 6 shows a simplified architecture for an example of a wireless communication device 605. The device 605 includes one or more antennas 610, transceiver 615, processor 630, and memory 640. The processor 630 can include one or more processor cores. The device 605 can include one or more memories 640 configured to store information such as data, instructions, or both. The transceiver 615 includes transmit and receive chain circuitry. For example, a receive chain of the transceiver 615 can include parallel code and frequency synchronization circuitry 650. In some implementations, circuitry 650 includes a multi-core processor, where one core is configured for code synchronization and another core is configured for frequency synchronization. Various examples of one or more processors that can be included in circuitry 650 includes a digital signal processor (DSP), a field-programmable gate array (FPGA), or a general-propose processor. In some implementations, the transceiver 615 includes integrated transmitting and receiving circuitry. In some implementations, the device 650 includes dedicated circuitry for transmitting and dedicated circuitry for receiving.

In some implementations, the device 605 can be in compliance with the ZigBee or ZigBee PRO specification, which are based on the IEEE 802.15.4 standard. A ZigBee data packet can include a preamble, a start of packet delimited, PHY header, and PHY service data unit. The preamble includes 32 bits, which are set to a known preamble sequence of all zeros. This potentially produces up to 32 peaks. In parallel processing as described herein, frequency synchronization can start as early as the second peak. Code and frequency synchronization may use less than the full 32 bits of the ZigBee preamble, with the remaining bits reserved for tolerance. In some implementations, the device 605 can be in compliance with an IEEE 802.11 family standard such as 802.11b/g/n/ac. In some implementations, the device 605 can be in compliance with an IEEE 802.15 family standard.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims.

What is claimed is:

1. A method, comprising:
   receiving a signal via a wireless channel;
   performing code synchronization by at least using a peak counter to count peak correlations based on (i) the signal and (ii) a known preamble;
   performing frequency synchronization based on the signal, wherein performing the frequency synchronization comprises starting the frequency synchronization during the code synchronization, the frequency synchronization comprising a coarse frequency acquisition and a fine frequency acquisition, wherein starting the frequency synchronization comprises starting the fine frequency acquisition when an output value of the peak counter satisfies a predetermined criterion, the predetermined criterion being based on a predetermined peak count value; and
   using, based on a successful completion of the code synchronization, at least a result of the frequency synchronization to demodulate data from the signal.

2. The method of claim 1, wherein performing the code synchronization comprises:
   producing approximate sample timing information at a first time period; and
   producing revised sample timing information at a later, second time period.

3. The method of claim 2, wherein performing the frequency synchronization comprises using a down sampled version of the signal that is based on the approximate sample timing information.

4. The method of claim 1, comprising:
   detecting a reset event; and
   performing a reset of the code synchronization and the frequency synchronization in response to the event.

5. The method of claim 1, wherein starting the frequency synchronization comprises:
   starting the coarse frequency acquisition when an output value of the peak counter satisfies a criterion based on an additional predetermined peak count value.

6. The method of claim 1, comprising:
   detecting an event that resets the peak counter;
   performing a reset of the code synchronization in response to the event; and
   performing a reset of the coarse frequency acquisition and the fine frequency acquisition in response to the event.

7. A wireless communication device comprising:
   circuitry configured to receive a signal via a wireless channel;
   a peak counter configured to count peak correlations based on (i) the signal and (ii) a known preamble;
   a code synchronizer configured to perform code synchronization based on an output of the peak counter;
   a frequency synchronizer configured to perform frequency synchronization based on the signal, wherein the frequency synchronization is started during the code synchronization, the frequency synchronization comprising a coarse frequency acquisition and a fine frequency acquisition, wherein the frequency synchronizer is configured to start the fine frequency acquisition when an output value of the peak counter satisfies a predetermined criterion, the predetermined criterion being based on a predetermined peak count value; and
   a demodulator configured to use, based on a successful completion of the code synchronization, at least a result of the frequency synchronization to demodulate data from the signal.

8. The device of claim 7, wherein the code synchronization comprises:
   producing approximate sample timing information at a first time period; and
   producing revised sample timing information at a later, second time period.

9. The device of claim 8, wherein the frequency synchronization comprises using a down sampled version of the signal that is based on the approximate sample timing information.

10. The device of claim 7, comprising:
    circuitry configured to detect a reset event; and
    circuitry configured to perform a reset of the code synchronization and the frequency synchronization in response to the event.

11. The device of claim 7, wherein the frequency synchronizer is configured to start the coarse frequency acquisition when an output value of the peak counter satisfies a criterion based on an additional predetermined peak count value.

12. The device of claim 7, comprising:
circuitry configured to detect an event that resets the peak counter;
circuitry configured to perform a reset of the code synchronization in response to the event; and
circuitry configured to perform a reset of the coarse frequency acquisition and the fine frequency acquisition in response to the event.

13. A system comprising:
a signal interface configured to receive a signal; and
circuitry configured to perform operations comprising:
performing code synchronization by at least using a peak counter to count peak correlations based on (i) the signal and (ii) a known preamble;
performing frequency synchronization based on the signal, wherein performing the frequency synchronization comprises starting the frequency synchronization during the code synchronization, the frequency synchronization comprising a coarse frequency acquisition and a fine frequency acquisition, wherein starting the frequency synchronization comprises starting the fine frequency acquisition when an output value of the peak counter satisfies a predetermined criterion, the predetermined criterion being based on a predetermined peak count value; and
using, based on a successful completion of the code synchronization, at least a result of the frequency synchronization to demodulate data from the signal.

14. The system of claim 13, wherein performing the code synchronization comprises:
producing approximate sample timing information at a first time period; and
producing revised sample timing information at a later, second time period.

15. The system of claim 14, wherein performing the frequency synchronization comprises using a down sampled version of the signal that is based on the approximate sample timing information.

16. The system of claim 13, wherein the operations comprise:
detecting a reset event; and
performing a reset of the code synchronization and the frequency synchronization in response to the event.

17. The system of claim 13, wherein starting the frequency synchronization comprises:
starting the coarse frequency acquisition when an output value of the peak counter satisfies a criterion based on an additional predetermined peak count value.

18. The system of claim 13, wherein the operations comprise:
detecting an event that resets the peak counter;
performing a reset of the code synchronization in response to the event; and
performing a reset of the coarse frequency acquisition and the fine frequency acquisition in response to the event.

* * * * *